Jan. 5, 1943.  W. V. THELANDER  2,307,340
FRICTION CLUTCH PLATE
Original Filed July 22, 1939
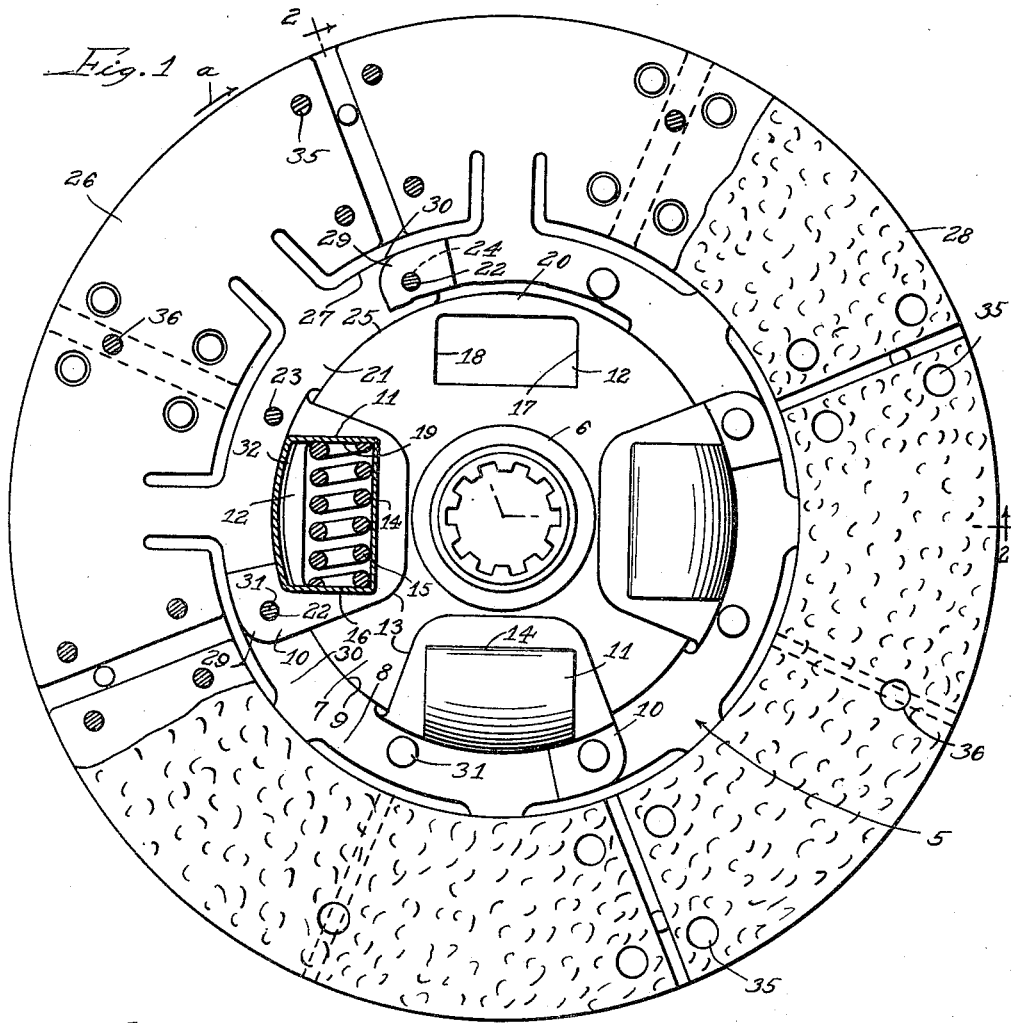
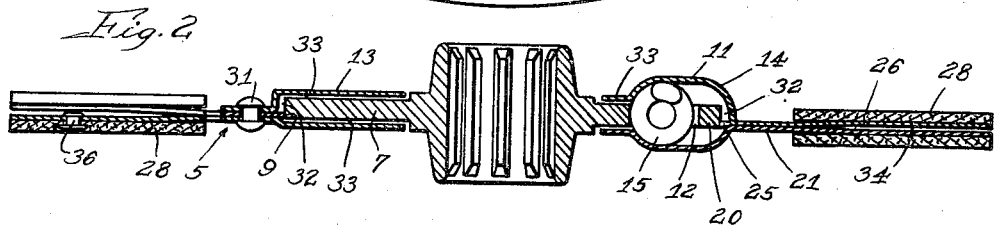
Inventor.
W. Vincent Thelander
By
McCanna, Wintercorn & Moreloch
Attys.

Patented Jan. 5, 1943

2,307,340

UNITED STATES PATENT OFFICE 2,307,340

FRICTION CLUTCH PLATE

W. Vincent Thelander, Auburn, Ind.

Original application July 22, 1939, Serial No. 285,840. Divided and this application December 22, 1941, Serial No. 424,083

5 Claims. (Cl. 192—68)

This application is a division of my copending application Serial No. 285,840, filed July 22, 1939.

This invention relates to improvements in friction clutches for motor vehicles and is particularly concerned with a new and improved clutch plate.

Clutch plates have been spring cushioned to dampen vibrations, and along with the spring cushioning means many have seen fit to provide frictional means of one kind or another to resist relative movement between the plate and its hub, the theory being that the larger and harsher power impulses are absorbed by the spring cushioning means whereas the minor engine vibrations, which when synchronized with the vibrations from the rear portion of the transmission train set up a high frequency noise, are absorbed or dampened by the separate braking means. However, realizing that to be mere theory which moreover meant the addition of complicated and expensive construction, which if it could be eliminated or at least simplified would make possible the manufacture of clutch plates at much lower cost, I experimented and gradually reduced the friction lag or drag and found that there was less and less vibration and noise noticeable in the car. I have, therefore, come to the conclusion that the more accurate theory is this:

The springs for cushioning purposes are in and of themselves a vibration dampening means in addition to transmitting power, and it is therefore to no purpose to tie together by friction means the relatively rotatable plate and hub but the addition of such friction means serves only to conduct to an undesired degree vibrations from the rear portion of the transmission train to the plate, which then acts as a sounding board or diaphragm amplifying the audible noises. It is therefore the principal object of my invention to provide a spring cushioned clutch plate devoid of frictional braking means and in fact specially constructed with a view to obtaining as nearly as possible zero friction lag or drag between the plate and its hub. It is also an important object to have the plate of sectional construction so as to reduce whatever small amount of sounding board or diaphragm effect might otherwise still be noticeable.

The invention is illustrated in the accompanying drawing, in which—

Figure 1 is a face view of a clutch plate made in accordance with my invention showing two of the spring pockets in outside elevation, a third in longitudinal section, and a fourth broken away so as to show the registering opening in the center hub flange, there being also a portion of the friction mat broken away to illustrate better the sectional construction of the plate, and Fig. 2 is a cross-section on the broken line 2—2 of Figure 1.

The same reference numerals are applied to corresponding parts in these views.

The clutch plate shown at 5 is generally similar to that disclosed in my Patent 2,244,134, and comprises relatively rotatable inner and outer portions, the inner portion being formed by a center hub 6 splined for driving connection with the driving shaft of the transmission and provided with an annular flange 7 onto which the outer portion 8 of the plate is adapted to be assembled in true concentric relation with the circular periphery 9 of the flange. The outer portion 8 in accordance with my patent is made up of an even number of sections 10, eight being shown in the present case, four facing one way and the other four facing the other way. With that number of sections I provide four spring pockets 11 for cooperation with registering substantially rectangular openings 12 in the flange 7, because each section 10 has an ear 13 overlying one side of the flange 7 and formed to provide therein a struck-out or embossed portion 14 of substantially semicylindrical form to form half of a spring pocket. The pockets 11 form housings for the spring cushioning means consisting of a set of heavy coiled compression springs 15, one in each pocket, fitting in the openings 12 and housed between the embossed portions 14 of the ears 13. Assuming the drive to be in the direction of the arrow $a$ in Figure 1, that is clockwise, the drive is assumed by the springs 15 bearing against one end wall 16 of each of the pockets 11 while the other ends of the springs bear against the opposite end 17 of the openings 12 in the flange 7. In coasting, when the drive is from the hub 6 to the outer section 8 through the flange 7, the springs 15 act between the other ends 18 of the openings 12 and the opposite end walls 19 of the pockets 11. By assembling the springs 15 in rectangular openings 12 as distinguished from notches opening to the periphery of the flange 7, I avoid danger of the springs moving outwardly under centrifugal force when the clutch plate turns at high speed, there being the connecting web portions 20 at the periphery of flange 7 to retain the springs 15 in normal position. The flange 7 is furthermore strengthened by these web portions 20 so that there is less likelihood of distortion of the flange under long service.

The mode of assembling the multi-section plate using the eight stamped sheet metal plate sections 10 is more fully disclosed in my patent above mentioned, but a study of Figure 1 should serve to make the construction clear. Looking at that plate section 10 which has the spring pocket and spring therein appearing in section, it will be seen that the ear 13 from which the semi-cylindrical pocket part 14 is struck extends approximately half the length of the arcuate body 21 of the plate section and is disposed between two rivet holes 22 and 23 on that half of the body, a third rivet hole 24 being provided in the other end of the body. The ear 13 projects radially inwardly from the inner arcuate edge 25 of the body and there is a segmental-shaped larger ear 26 projecting radially from the outer arcuate edge 27 of the body at the middle thereof, the ear 26 being symmetrical with respect to the middle rivet holes 23, as shown. The ears 26 on the correlated plate sections in the assembled plate 5 provide an annulaar mat support for application of the facings 28 of suitable composition material, usually containing asbestos. The main body portion 21 of each plate section is in one plane except for the small end portion 29 struck out of the plane of the body portion an amount equivalent to the thickness of a plate section so that when two plate sections are placed face to face there is enough space left therebetween for the free end portion 30 of a third plate section. In fact, each of the rivets 31 for fastening the plate sections together passes through registering holes in three overlapping sections. Thus plate sections on the one face of the plate are overlapped at adjoining ends so that the rivet hole 22 in one section registers with the rivet hole 24 in the next section and so on. The same is true on the other face of the plate 5 but the plate sections on that face are reversed end for end and offset angularly enough to bring the ears 13 on the two faces of the plate in register to form the pockets 11. In that way the rivet holes 22 and 24 of one set of plate sections register with the intermediate rivet holes 23 in the other set. In passing it will also be observed that the ears 13 are struck out of the plane of the main body portion 21 approximately in the same plane with the opposite end portions 29. Thus when the plate sections are assembled together in the manner described, all of the ears 13 of one set are in one plane parallel with the plane of one face of the flange 7 whereas the ears 13 of the other set are in a parallel plane parallel with the plane of the other face of the flange 7. The interchangeability of the plate sections makes for quick and easy assembling of these clutch plates, and also is an important factor in reducing cost because of the saving in die costs thereby realized. The fact that each plate section represents approximately one-eighth of a whole plate means that the individual section can be produced from such a small piece of sheet metal that scrap from the production of other sheet metal articles may be used and a great saving in cost thereby effected. The small size and the particular shape of the individual plate sections also permits stamping the same from regular sheet stock with very little waste—much less than is necessarily involved where a whole plate is punched out—and there is accordingly an appreciable saving in cost even where ordinary methods of production are followed.

The plate sections of both sets have an easy working fit on the circular periphery 9 of the flange 7 of the hub 6 by engagement of the arcuate inner peripheries 25 thereon, definite wide clearances being left otherwise between the outer section 8 of the plate 5 and the circular periphery 9 of the flange 7 as indicated clearly in the two views. Notice the wide clearance at 32 between the outer periphery 9 of the flange 7 and the arcuate outer wall of the pockets 14 and also the wide clearances at 33 between the inner sides of the ears 13 and both sides of the flange 7. The outer section 8 of the plate 5 is therefore in floating relation to the flange 7 of the hub 6 with a view to obtaining zero friction lag or drag, as nearly as that is possible in commercial production of friction clutch plates in large quantities. To illustrate to what a marked degree the friction drag has been reduced, I might state that whereas the standard practice among clutch manufacturers is to provide friction braking means effective to the extent of providing from one and one-half to three foot pounds of friction drag, I have eliminated the braking means and otherwise specially constructed the plate so as to reduce the friction drag to approximately a half foot pound. Extensive tests have shown that the more the friction drag was reduced the less the vibration and noise otherwise noticeable in the car became. The vibration was measured with a diaphragm or amplifier on the gear shift lever and became less and less perceptible with the reduction in friction drag. I am therefore convinced that the springs 15 constitute a vibration dampening means besides serving as a resilient power transmitting means and that any frictional braking means between the plate and its hub is absolutely non-essential and, far from serving a useful purpose, is actually detrimental because of the conduction therethrough of vibrations from the hub to the plate. With my construction the transmission of vibration from the hub to the plate is minimized by keeping the plate in floating relation to the hub axially and having only sufficient bearing engagement peripherally of the hub to keep the plate in centered relation therewith. The axial float is provided by the clearances 33 as previously indicated, and the plate has bearing engagement with its inner periphery 25 on the outer periphery 9 of the flange 7 to keep the plate in centered relation to the hub 6. The sectional construction of the plate is further believed to be responsible for reduction in noise because it is obvious that a built-up plate does not have the same sound amplification properties as a one-piece plate.

The ears 26 are struck out of the plane of the main body portions 21 to a slight extent, as indicated in Fig. 2, and since the ears 26 of one set of plate sections are offset in one direction with respect to the plane of the plate and the ears 26 of the other set are offset in the opposite direction, as clearly appears in Fig. 2, the space left between the ears of the two sets, indicated at 34, results in a desired mush effect. Rivets 35 entered through the ends of the mats 28 serve to secure one mat to each of the ears 26, and another rivet 36 entered through the middle of each mat serves to prevent buckling thereof away from the supporting ear.

It is believed the foregoing description conveys a good understanding of the objects and advantages of my invention. The appended claims have been drawn to cover all legitimate modifications and adaptations.

I claim:

1. A spring cushioned vibration dampening clutch plate comprising a center hub having an annular flange with a circular periphery concentric with the hub, a friction material supporting annulus having the outer marginal portion thereof carrying the friction material and having the inner marginal portion thereof disposed in overlapping relation with both side faces of the flange and fitting loosely around the hub, said annulus having an annular shoulder thereon radially between the outer and inner marginal portions slidably engaging the periphery of said flange, said flange having one or more openings provided therein for spring cushioning means, and spring cushioning means in said openings for transmitting drive resiliently between the annulus and hub.

2. A spring cushioned vibration dampening clutch plate comprising a center hub having an annular flange with a circular periphery concentric with the hub, a plurality of clutch plate sections circumferentially arranged around the hub, some of the sections overlapping the front face of the flange and some of said sections overlapping the rear face thereof, whereby to limit axial displacement of the hub with respect to said plate sections, means for fastening said plate sections together forming an annulus substantially concentric with the hub, said annulus defining an annular shoulder thereon radially between the outer and inner marginal portions thereof concentric with the annulus and slidably engaging the periphery of said flange, said flange having one or more openings provided therein for spring cushioning means, spring cushioning means in said openings for transmitting drive resiliently between the annulus and hub.

3. A spring cushioned vibration dampening clutch plate, comprising a center hub having an annular flange with a circular periphery concentric with the hub, a plurality of clutch plate sections circumferentially arranged around the hub, some of the sections overlapping the front face of the flange and some of said sections overlapping the rear face thereof, whereby to limit axial displacement of the hub with respect to said plate sections, means for fastening said plate sections together forming an annulus substantially concentric with the hub, said annulus defining an annular shoulder thereon radially between the outer and inner marginal portions thereof concentric with the annulus and slidably engaging the periphery of said flange, the inner marginal portions of said plate sections overlapping the flange being formed to provide pockets, and said flange being formed to provide circumferentially spaced cut-out portions in register with said pockets defining drive faces at opposite ends thereof in circumferentially spaced relation, the opposite ends of the pockets also defining driving faces, and spring means enclosed in said pockets for engagement at one end with a drive face on the flange and at the other end with a drive face in the pockets, said spring means being adapted to be assembled in the pockets and cut-out portions prior to the fastening together of the plate sections.

4. A spring cushioned vibration dampening clutch plate, comprising a center hub having an annular flange with a circular periphery concentric with the hub, a plurality of clutch plate sections circumferentially arranged around the hub, some of the sections overlapping the front face of the flange and some of said sections overlapping the rear face thereof, whereby to limit axial displacement of the hub with respect to said plate sections, means for fastening said plate sections together forming an annulus substantially concentric with the hub, said annulus defining an annular shoulder thereon radially between the outer and inner marginal portions thereof concentric with the annulus and slidably engaging the periphery of said flange, said flange having one or more openings provided therein for spring cushioning means, spring cushioning means in said openings for transmitting drive resiliently between the annulus and hub, and annularly arranged pieces of friction material supported on opposite sides of the annulus in substantially concentric relation with the hub, the pieces being secured individually to the outer marginal portions of the plate sections, the outer marginal portions of some of said plate sections being normally disposed in a plane in spaced substantially parallel relation to the outer marginal portions of the other plate sections.

5. A spring cushioned clutch plate, comprising a center hub having an annular flange with a circular periphery concentric with the hub, a clutch plate structure carried thereby and movable rotatively relative thereto against spring resistance, comprising a plurality of plate sections circumferentially arranged around the flange, some having their radially inner portions overlapping one side of the flange and others having their radially inner portions overlapping the opposite side of the flange, whereby to limit axial displacement of the clutch plate structure relative to the hub in either direction, means for securing the plate sections together forming an annulus substantially concentric with the hub and slidably engaging the periphery of said flange to maintain concentric relationship with the hub in its movement rotatively relative thereto, and spring cushioning means for resiliently transmitting drive between the hub and clutch plate structure, said flange radially inwardly from its peripheral engagement with the plate sections being of reduced thickness so that its opposite side faces are spaced from the plate sections to minimize the transmission of vibration from the hub to said plate sections, and said clutch plate structure carrying friction material thereon for drive purposes, the built-up sectional construction of said plate structure resulting in minimum sound amplification incident to whatever vibrations are transmitted thereto from the hub.

W. VINCENT THELANDER.